United States Patent

Bateman et al.

[15] 3,686,626
[45] Aug. 22, 1972

[54] AIRCRAFT INSTRUMENT
[72] Inventors: Charles Donald Bateman; Lyle J. Noland, both of Bellevue, Wash.
[73] Assignee: United Control Corporation
[22] Filed: June 3, 1970
[21] Appl. No.: 42,918

[52] U.S. Cl. ............ 340/27 NA, 244/77 D, 244/77 G
[51] Int. Cl. ....... G08g 5/00, B64c 13/50, B64c 15/00
[58] Field of Search ................ 244/77 D, 77 G, 77 A; 340/27 R, 27 SS, 27 NA

[56] References Cited

UNITED STATES PATENTS

| | | | |
|---|---|---|---|
| 3,077,557 | 2/1963 | Joline | 244/77 G |
| 3,052,122 | 9/1962 | Westerback | 244/77 D |
| 3,569,926 | 3/1971 | Korn | 340/27 NA |
| 3,448,948 | 6/1969 | Reerink | 244/77 G |
| 3,051,416 | 8/1962 | Rotier | 244/77 G |
| 3,276,255 | 10/1966 | Hattendorf | 244/77 D |
| 3,521,227 | 7/1970 | Congleton | 340/27 R |
| 3,577,120 | 5/1971 | Sherbert | 340/27 NA |

*Primary Examiner*—Kathleen H. Claffy
*Assistant Examiner*—William A. Helvestine
*Attorney*—Hofgren, Wegner, Allen, Stellman & McCord

[57] ABSTRACT

An aircraft instrument providing visual flight path guidance to the pilot during landing approach, to clear an obstacle or the like. A head-up collimated display has a transverse bar positioned in accordance with a signal representing the angle of attack of the aircraft, with a corrective bias, which indicates to the pilot the flight path of the aircraft. The display includes a vertical scale positioned with respect to a horizontal reference, indicating to the pilot the angle of the path from the aircraft to a point on the ground.

The angle of attack signal displayed by the bar is biased by a signal derived from the rate of change of flight path of the aircraft to compensate for the effect of errors, as caused by winds having a component in the vertical plane containing the flight path.

Synthetic signals are developed for various flight conditions minimizing errors due to air mass movement and inherent inaccuracies of condition sensors.

21 Claims, 16 Drawing Figures

Patented Aug. 22, 1972

AIRCRAFT INSTRUMENT

This invention is concerned with an instrument providing an aircraft pilot with visual flight path guidance.

Instruments are known which present to the pilot, in a head-up display, information regarding the flight path angle and the projected touch-down point during a landing approach. Prior instruments have been unsatisfactory because of errors and deficiencies in the signals, resulting from winds and from other sources, and because the display apparatus have had optical deficiencies and were bulky and expensive. This invention is concerned primarily with the generation of signals to be displayed which obviate the errors and deficiencies of the signals used in prior instruments. An application of Robert K. Kirschner, Ser. No. 48,148, filed June 22, 1970, and assigned to the assignee of this invention, discloses and claims novel features of a collimated head-up display apparatus illustrated in this application.

One feature of the invention is the provision of an aircraft instrument including means establishing a signal representing a flight path condition of the aircraft, means displaying the signal for the pilot, means establishing a bias signal representing the change in flight path as the pilot follows the display, and means for combining the signals in the pilot display. More particularly, the instrument utilizes a signal representing angle of attack in a collimated head-up display, indicating to the pilot the projected touch-down point for the aircraft. A signal representing a rate of change of the flight path is developed and processed through a limiter and an integrator providing a compensating bias signal which is combined with the angle of attack signal for display to the pilot.

Another feature of the invention is the generation of an inertial angle of attach signal for the aircraft, based on the flight path angle and the pitch angle, reducing inaccuracies resulting from wind vectors, turbulence and the like.

A further feature is that the signal used in the pilot display is compensated by a signal representing ground speed acceleration of the aircraft, further reducing inaccuracies due to air mass movements. In one form of the invention, the ground speed acceleration is inherently developed as an acceleration error in the pitch signal from a vertical gyroscope. In another form of the system, the ground speed acceleration is measured.

Still another feature of the invention is that a signal representing the flight path of the aircraft, if not available directly from an air data computer on the aircraft, is generated by dividing the vertical velocity of the aircraft by its forward velocity. Errors in the vertical and forward velocity signals are minimized by synthesizing these terms from signals representing the barometric altitude and normal acceleration, and from air speed and longitudinal acceleration, respectively.

And another feature of the invention is the provision of means for developing a further signal for combination in pilot display which anticipates response of the aircraft to manipulation of aircraft controls.

Further features and advantages of the invention will readily be apparent from the following specification and from the drawings, in which:

FIG. 8a is a partial block diagram of an instrument with positive bias compensation;

FIG. 8b is a diagrammatic illustration of the aircraft flight path utilizing the instrument of FIG. 8a;

FIG. 9a is a partial block diagram of an instrument with negative bias compensation;

FIG. 9b is a diagrammatic illustration of the aircraft flight path utilizing the instrument of FIG. 9a;

The visual flight path aid is illustrated and described herein as used during the approach to a landing. It is anticipated that one of its major uses will be in this particular flight procedure. The instrument may also be used to provide the pilot with flight path information during a climb or a descent. More particularly, the instrument can be utilized to provide the pilot with information concerning the relation between the flight path of the aircraft and an obstacle, as a mountain, for example.

Figures 1, 3:
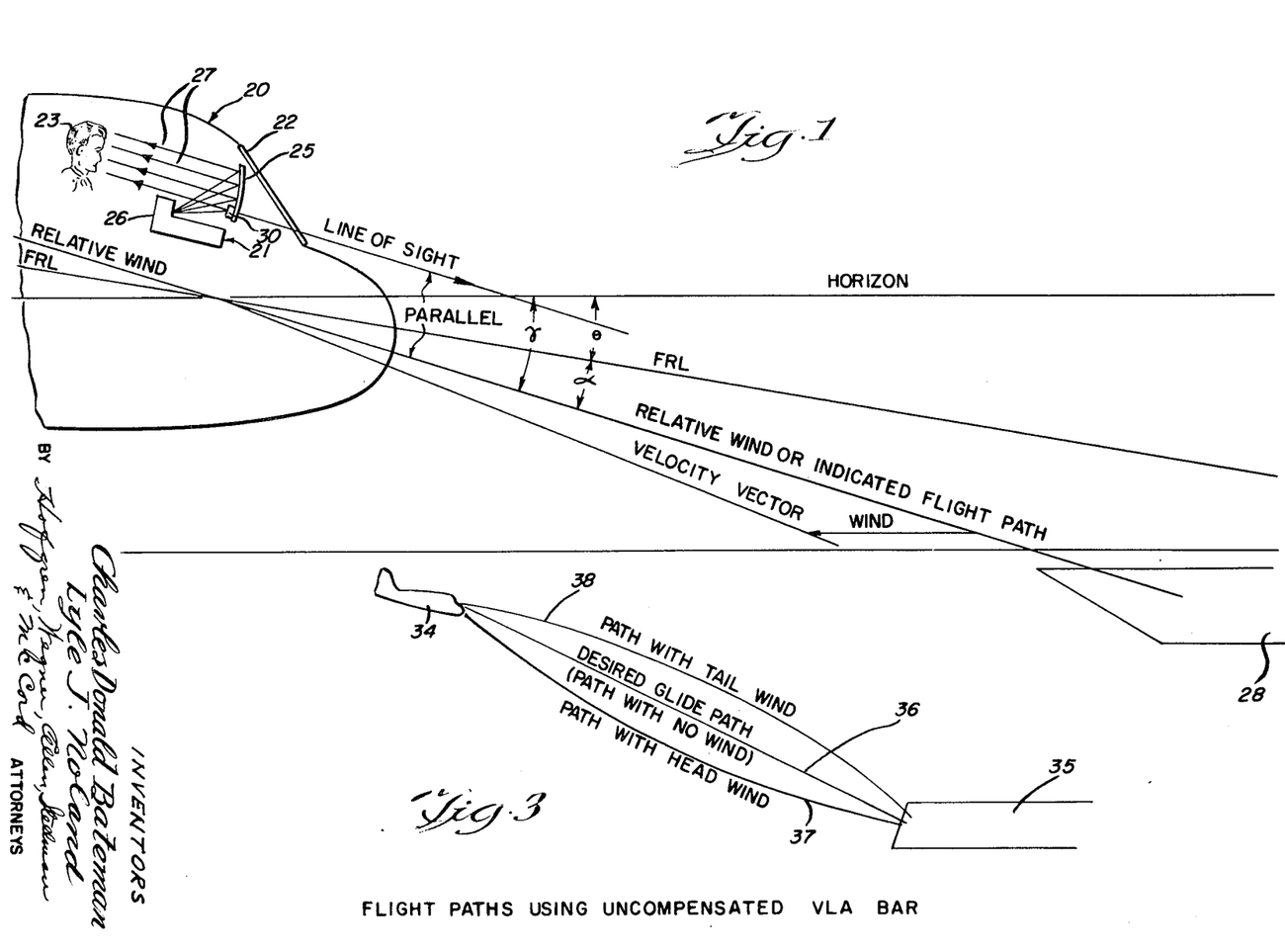
FIG. 1 is a diagrammatic illustration of a portion of an aircraft, the visual landing aid display, the pilot and the end of a runway during a typical landing approach.
FIG. 3 is a drawing illustrating the effect on the aircraft flight path of head and tail winds.
Figure 2:
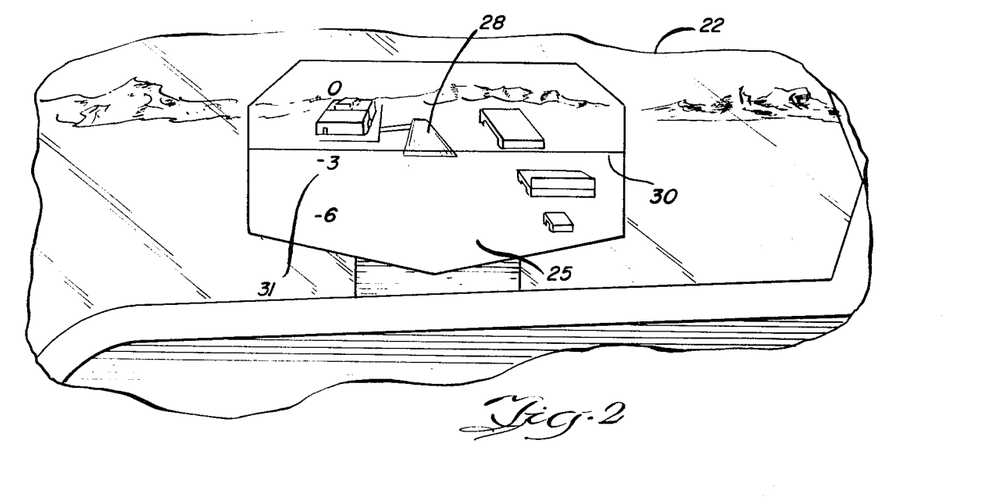
FIG. 2 is a fragmentary view illustrating the relationship of the display indicia and the ground as seen by the pilot during a landing approach.

In the cockpit of aircraft 20, a head-up display instrument 21 is mounted inside windshield 22 and in the normal line of sight of pilot 23. The head-up display includes an image combiner screen 25 on which indicia are projected from source 26. The combiner screen is partially reflective so that the projected indicia and the outside world are both visible to the pilot with the indicia superimposed on ground features as illustrated in FIG. 2. The screen and indicia source are so configured and related that the reflected light is collimated, as indicated by parallel light rays 27, and the relation of the indicia to ground features is not dependent on the position of the pilot's head. The combiner screen 25 is of sufficient size to permit binocular vision of the display and a runway 28, during descent.

In accordance with the invention, there is displayed on the combiner 25 a transverse line 30 and vertically oriented scale indicia 31. The transverse bar 30, shown in an exaggerated form in FIG. 1, is positioned vertically on the display with reference to the aircraft fuselage in accordance with a signal representing basically the angle of attach of the aircraft. The bar will thus be positioned at an angle with respect to the earth's horizon representing the aircraft's flight path. The vertical scale 30 is positioned by a signal from a vertical gyroscope. When the aircraft is at a relatively low altitude, as during an approach for landing, the zero degree indication of the vertical scale is locked with the horizon. The scale indicia indicate the flight path angle to be followed by the aircraft to reach the point on the ground over which the indicia appears. The transverse line or bar 30 indicates the point the aircraft will reach if it continues with the same configuration and power setting.

Some of the angular relationships involved are illustrated diagrammatically in FIG. 1. The airplane 20 has a pitch angle, $\theta$, which is below the horizontal and has a negative sign. This is the angle between the horizon and an extension of the fuselage reference line, FRL. The angle of attach, $\alpha$, is the direction of the relative wind with respect to the aircraft body. The pilot, looking past the bar 30, positioned in accordance with the angle of attack, sees an indicated flight path $\gamma$, where $\gamma = \theta + \alpha$.

In utilizing the visual landing aid in a typical situation, a pilot might approach runway 28 flying at a fixed altitude of 2,000 feet. As he approaches the end of the runway, the angle between the aircraft and the runway will increase (in the negative direction), as indicated by the vertical indicia 31 of the display. In this flight condition the bar 30 is superimposed on the horizon. When the end of the runway is aligned with the scale marking for the glide slope to be followed, as −3°, for example, the pilot pitches the airplane over, reduces power on the engines, and aligns the bar 30 with the end of the runway. The plane is then flown toward the runway keeping the bar 30 aligned with the end of the runway, or the desired touch-down point, by co-ordinated manipulation of the elevators and/or throttles.

A visual landing aid instrument utilizing the measured angle of attack of the aircraft operates satisfactorily in still air. However, calm air conditions are the exception rather than the rule; and a wind which has a component in the plane of the aircraft flight path causes an error in the instrument indication which reduces its reliability as a pilot aid. The problem is illustrated in FIG. 3 where a plane 34 is shown approaching a runway 35. Under calm conditions, a pilot using the VLA instrument 21 will cause the airplane to follow glide path 36 to the touch-down point. If, however, the airplane encounters a head wind, the actual flight path will be below that of the desired or indicated flight path. The VLA bar will tend to be below the touch-down point in the display causing the pilot to raise the nose of the air craft to try to reach the desired touch-down point. As a result, the flight path becomes shallower and shallower and the pilot may find it necessary to add power in order to reach the runway. The vector diagram in FIG. 1 shows the relationship between the wind relative to the aircraft, the head wind component and the velocity vector of the aircraft.

The converse situation is encountered with a tail wind. Here with the pilot following the bar 30 of the landing aid, the aircraft will tend to overshoot the runway, following flight path 38, FIG. 3. As a result, the path of the airplane becomes more steep as it nears touch-down and the landing may be made at an excessive speed.

The undesirability of an instrument with these wind errors is obvious. Furthermore, if the wind velocity is a significant part of the landing speed (and this may often be the case with STOL aircraft which land at very low speeds), the tendency to undershoot or overshoot a landing may be quite dangerous.

In accordance with the invention, a corrective bias is added to the basic angle of attach signal displayed by the VLA bar. An example of a system embodying the invention is illustrated in a functional block diagram form in FIG. 4. An angle of attach sensor 40, which may be a vane mounted on the body of the airplane, generates an angle of attack signal, $\alpha$. The angle is connected through a lag network 41, damping short term variations representing noise or wind gusts, to the visual landing aid instrument 21, where it provides the drive to position bar 30.

Figure 4:
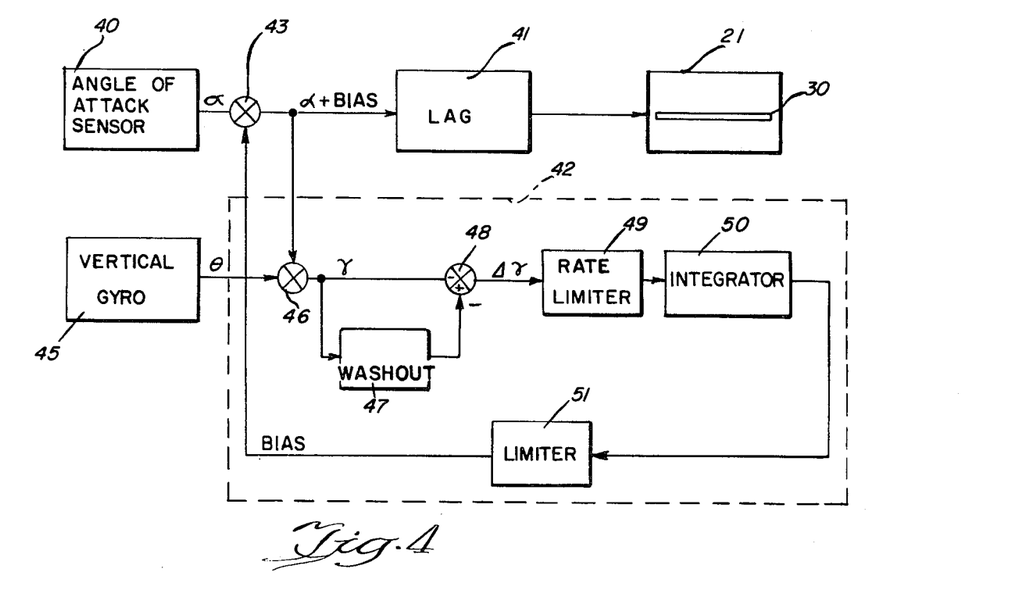
FIG. 4 is a block diagram illustrating one form of instrument embodying the invention.

A compensating circuit, indicated by the broken line box 42, generates a signal representing the change in flight path angle which occurs during the descent as the pilot manipulates the aircraft controls to keep the bar 30 positioned over the desired touch-down point. This signal is added to the angle of attack signal at summing point 43 so that the composite signal is coupled through the lag network 41 to the indicator bar 30. The modified angle of attack signal forces the pilot to follow a flight path approximating the desired flight path regardless of the wind condition.

The bias signal produced by compensating circuit 42 is based on the change of flight path of the aircraft. By sensing this change and adding a signal representing it to the basic angle of attack signal, the need for additional change is minimized. In the embodiment of the instrument illustrated in FIG. 4, a signal representing the aircraft flight path is derived from the composite $\alpha+$ bias signal. As illustrated in FIG. 1, the flight path angle $\gamma$ is the sum of the angle of attack and pitch angles. A vertical gyroscope 45 generates a signal representing the pitch angle $\theta$. This is combined with the composite $\alpha+$ bias signal at summing junction 46, providing a signal representing the flight path angle $\gamma$. An integrator circuit 47 develops a signal representing the steady state component of the flight path angle signal which is subtracted from the flight path signal at summing junction 48, the difference being a signal representing the change of flight path angle or $\Delta\gamma$. The flight path change signal is connected with a rate limiter 49 to prevent overcompensation of the system from intentional pilot maneuvers as distinguished from minor flight path corrections. The limited signal is connected with integrator 50 to establish a bias signal which is held over a long period of time. The bias signal is connected through limiter 51, again to prevent excessive compensation, with summing junction 43 where it is added to $\alpha$. The composite signal actuates the display bar.

Figure 5:
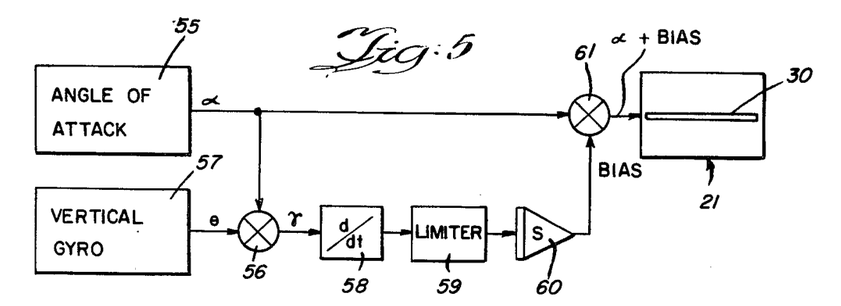
FIG. 5 is a block diagram of another instrument embodying the invention.

Another form of the instrument is illustrated in FIG. 5. Here, the angle of attach signal from sensor 55 is connected directly with summing junction 56 where it is summed with the pitch signal from vertical gyroscope 57 to provide the flight path signal $\gamma$. The flight path signal is connected with differentiator circuit 58 establishing a signal representing changes of flight path. The flight path change signal, $\dot{\gamma}$, is connected through limiter 59 with bias integrator circuit 60. The bias signal is combined with the angle of attack signal at summing junction 61 and the resulting signal is applied to the VLA instrument 21, positioning bar 30.

Figure 6:
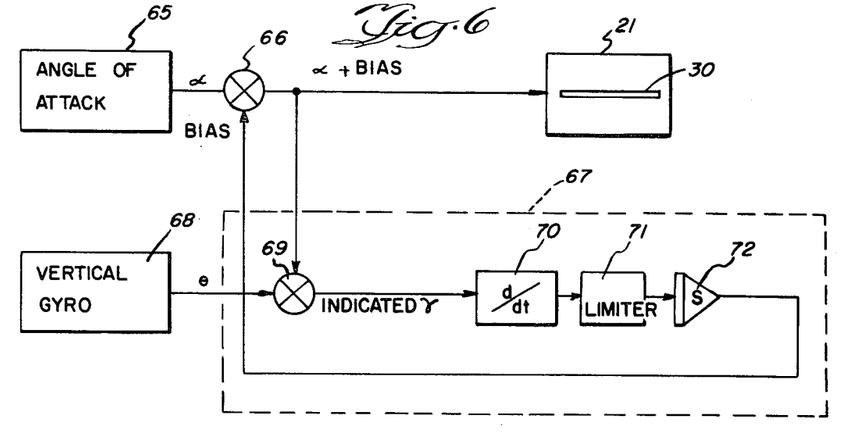
FIG. 6 is a block diagram of still another instrument embodying the invention.

FIG. 6 illustrates another form of the instrument, combining the circuits of FIGS. 4 and 5. The angle of attack signal from sensor 65 is summed at junction 66 with the bias signal from compensating circuit 67. The combined $\alpha+$ bias signal is summed with a pitch signal from vertical gyroscope 68 at summing point 69 to provide the indicated flight path signal. This signal is connected with differentiator circuit 70 and the flight path change signal is connected through limiter 71 to integrator 72. The integrator output is summed with $\alpha$ at junction 66 and the combined signal applied to the bar 30 of instrument 21.

Figure 7:
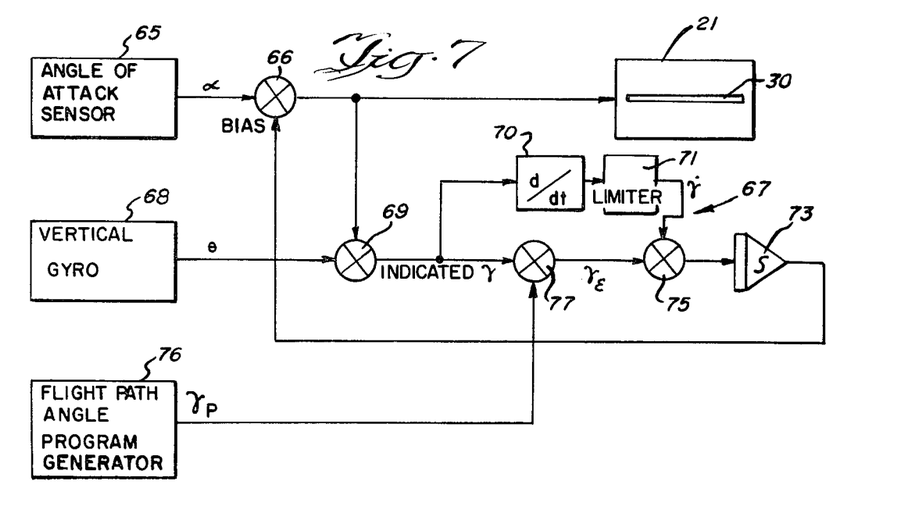
FIG. 7 is a block diagram of yet another instrument embodying the invention.

Another form of the invention, based on the circuit of FIG. 6 and utilizing a pre-established flight path program, is illustrated in FIG. 7. Corresponding elements are identified with the same reference numerals as in FIG. 6. Angle of attack signal $\alpha$ from sensor 65 is combined with a bias signal at summing junction 66. The $\alpha+$ bias signal is summed with a pitch signal from vertical gyroscope 68 at junction 69 providing the indicated flight path signal, $\gamma$. The flight path signal is connected with differentiator 70 and limiter 71, as in FIGS. 5 and 6, and the flight path change signal, $\dot{\gamma}$, is connected with an input of summing junction 75. A desired flight path angle, $\gamma_P$, is provided by program generator 76. The details of the generator or of the program which it generates are not essential to the present invention. It is sufficient to recognize that the programmed angle may be determined by one or more of a variety of inputs, as a manual pilot control, the altitude of the aircraft, the flap configuration of the aircraft, for example. The programmed flight path angle, $\gamma_P$, is subtracted from the indicated (actual) flight path angle $\gamma$ at summing junction 77. The difference, an error signal $\gamma_e$, is connected with an input of summing junction 75 where it is added to the flight path angle rate signal, $\dot{\gamma}$. The sum of these two inputs is connected with integrator 73 which establishes the bias signal that is combined with angle of attack at summing junction 66. The $\alpha+$ bias signal is connected with instrument 21, and positions director bar 30.

The manner in which the bias signal is combined with the angle of attack signal for display on the VLA bar has an effect on the nature of the flight path which the aircraft will follow. This is illustrated in FIGS. 8 and 9.

Figures 8, 8A, 8B:
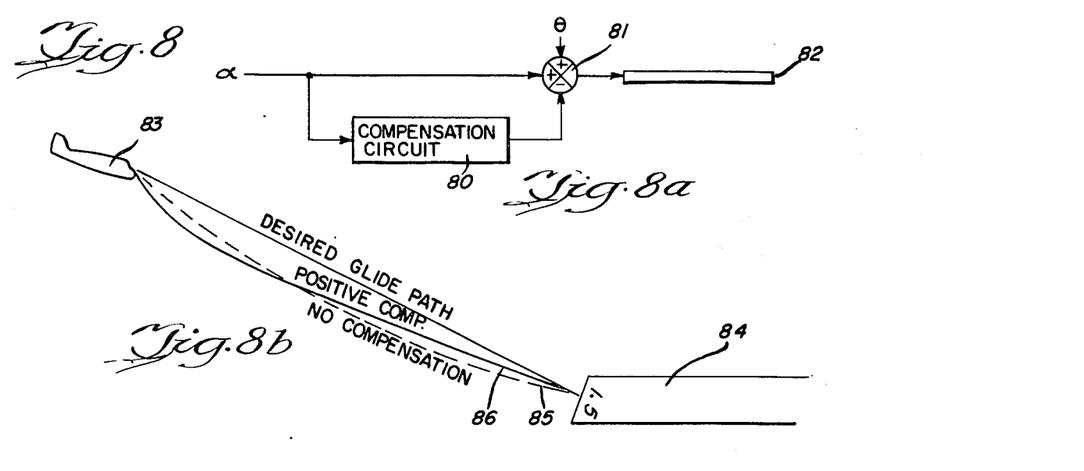

In the circuit of FIG. 8a, the bias signal derived from the flight path angle signal by compensation circuit 80 is subtracted from the displayed signal at summing junction 81. The pitch angle $\theta$ is also subtracted from the flight path angle $\gamma$ so that the output of the summing junction is the biased angle of attack signal applied to display bar 82. This particular system is considered as having positive compensation. The effect of positive compensation with a head wind is illustrated in FIG. 8b where an aircraft 83 is shown approaching the runway 84. The desired glide path, which would be followed in the absence of a wind, is a straight line from the aircraft to the touch-down point on the runway. Broken line 85 shows the path which would be followed by the aircraft should the pilot use a visual landing aid indication without a compensating signal. With the compensating signal the aircraft follows the path 86. It will be noted that positive compensation provides a signal to the display bar 82 which, if followed by the pilot, results in a touch-down at the desired point at the end of the runway. This system has the disadvantage, however, that at the start of the operation utilizing the compensated display, the flight path is substantially below the desired flight path. This action is sometimes referred to as a "duck under". If the airplane has sufficient altitude at the beginning of the maneuver, this is permissible. However, if the instrument is utilized in a situation where the aircraft is at low altitude, as where visual control is initiated when an aircraft breaks out of the clouds at a few hundred feet, the "duck under" flight characteristic may be dangerous. Similarly, if the approach is intended to clear an obstacle, the "duck under" characteristic is undesirable.

Figures 9A, 9B:
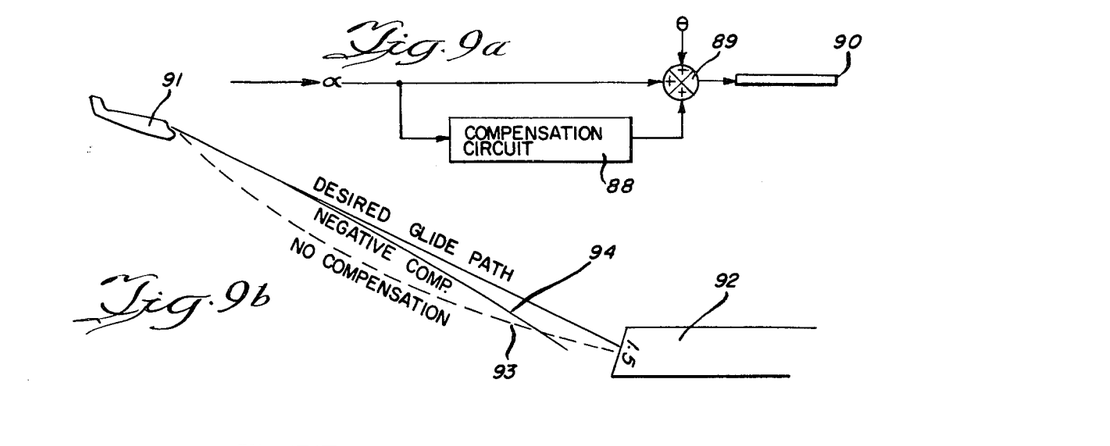

FIG. 9 illustrates negative compensation. Here, the bias signal from compensation circuit 88 is added to the flight path signal $\gamma$ at summing junction 89. Again, the pitch angle $\theta$ is subtracted. The biased angle of attack signal is displayed by the VLA bar 90. The flight characteristic for FIG. 9b again shows conditions for an aircraft 91 approaching runway 92 with a head wind. The desired flight path is a straight line. Without compensation a pilot flying the visual landing aid would follow broken line flight path 93. With negative compensation on the indicator bar, the aircraft will follow flight path 94. The actual flight path closely approximates the desired flight path during the early stages of the descent. However, as the bias signal from compensation circuit 88 increases, the deviation becomes greater. The duck-under characteristic of positive compensation is eliminated. However, if the system is utilized for a long approach, the pilot will observe from the pitch scale of the display that the flight path angle to the desired touch-down point is incorrect, and make a change to correct this situation.

In general, it can be seen that positive compensation provides accurate long-term operation while negative compensation provides accurate short-term operation. The system which is used will depend on the conditions under which the aircraft is operated.

Aircraft instruments which display information based on aircraft flight conditions have an accuracy which is related to the accuracy of the sensed conditions. The flight path indicator of the present invention is concerned with the relationship between the aircraft and the ground, essentially a navigational problem. Where the signals actuating the display are based primarily on air mass movement, as is the case where the basic input is the aircraft angle of attack measured by an angle of attack sensor, the instrument is subject to inaccuracies caused by wind components, turbulence, air noise and the like. Some aircraft are provided with inertial navigation systems (INS) or air data computers (ADC) which have output signals of flight path angle, for example, which may be used to drive the visual landing aid. In aircraft which do not have such sophisticated avionic equipment, it may be desirable to generate signals which are more accurate than the simple air mass based information that would be provided by an angle of attack vane, or other direct angle of attack sensor.

Figure 10:
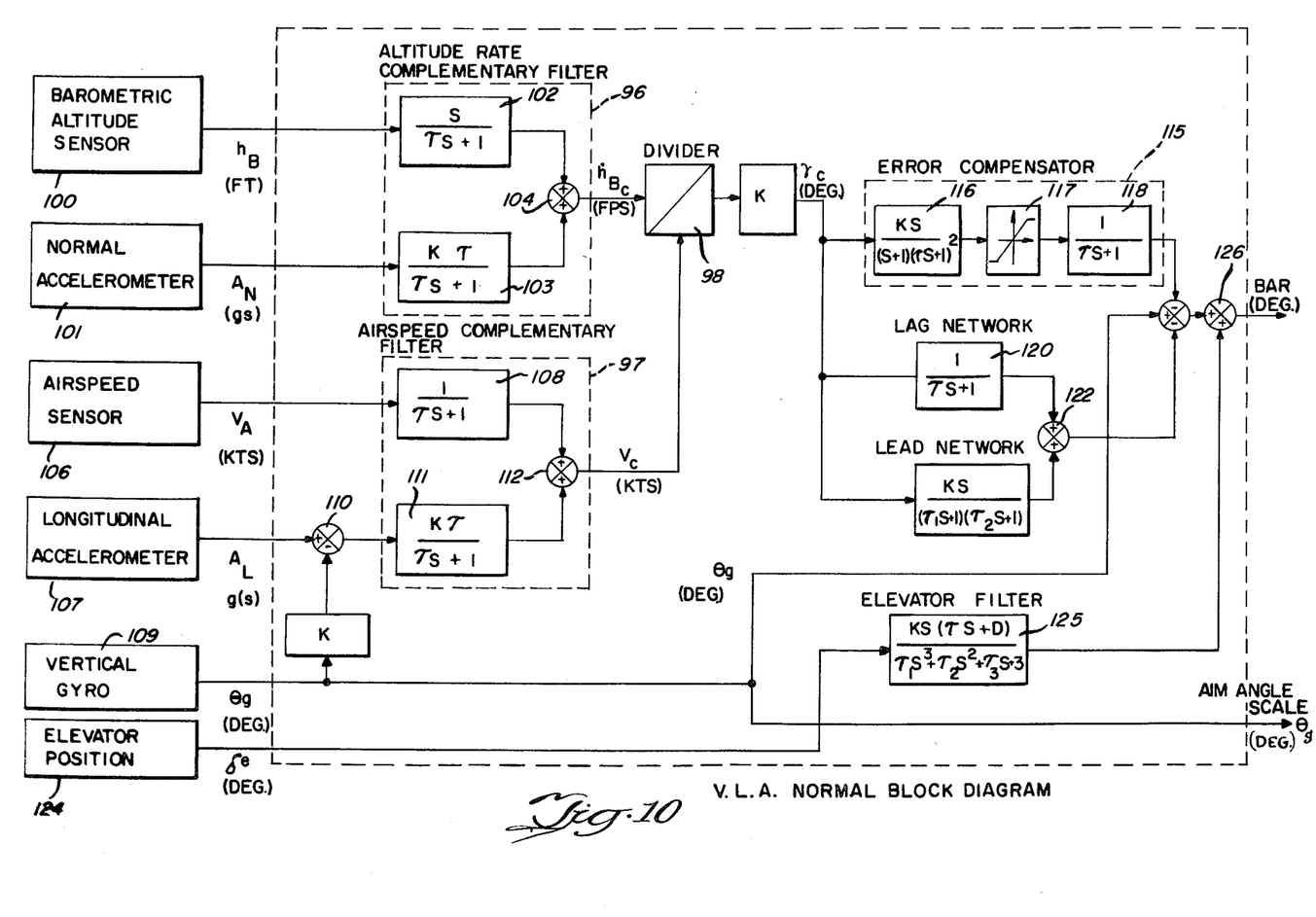
FIG. 10 is a functional block diagram of a preferred embodiment of the invention.

FIG. 10 illustrates in functional block diagram form a preferred embodiment of the invention utilizing several flight condition inputs, some of which are inertial, from which an accurate flight path angle signal is computed. In FIG. 10 the transfer functions for the various elements are indicated on the block diagram, with the gain indicated by K and the time constant by $\tau$. The gains and time constants are determined by various considerations including the dynamic characteristics of the sensors and the flight characteristics of the aircraft for which the instrument is designed. Accordingly, the letter designations are used and actual numbers are not given. It will be understood that K and $\tau$ in one block generally are different from K and $\tau$ in another block.

Briefly, the vertical velocity or altitude rate signal, $\dot{h}$, is derived from complementary filter 96, an airspeed or forward velocity signal, V, is generated by complementary filter 97 and the two signals are connected as the dividend and divisor, respectively, of divider circuit 98. The quotient is a signal representing flight path angle, $\gamma_c$.

The altitude rate or vertical velocity complementary filter has inputs $h_B$, from a barometric altitude sensor 100 and $A_N$, from normal accelerometer 101. Complementary filter 96 includes a filter 102 which differentiates and selects the long-term components of the barometric altitude signal $h_B$ and a filter 103 which integrates and passes the short-term components of the normal acceleration signal $A_N$. The two filtered signals are combined at summing junction 104 providing a calculated altitude rate signal $\dot{h}_{BC}$. The utilization of long-term information from the barometric altitude sensor takes advantage of the fact that such a sensor has a very accurate long-term output, but is subject to dynamic lags and to noise, which are eliminated by filter 102. Conversely, the signal from the normal accelerometer responds rapidly and accurately to short-term changes of vertical velocity. Accelerometers are, however, subject to steady state or long-term errors due to inaccuracies in mounting which produce permanent offsets. Again, by virtue of the filtering of the normal acceleration signal, the accurate short-term information is utilized while the long-term information subject to error is discarded.

In the airspeed complementary filter 97, airspeed, $V_A$, as from a pivot sensor 106, is combined with a forward acceleration signal derived from a pitch compensated longitudinal accelerometer 107. More particularly, the airspeed signal, which has long-term accuracy but is subject to dynamic lags and noise, is connected through filter 108 which passes only the long-term components. The longitudinal acceleration signal, $A_L$, from longitudinal accelerometer 107, is compensated for pitch errors by subtracting a signal from vertical gyroscope 109 at summing junction 110. The difference signal represents forward or ground speed acceleration of the aircraft. Filter 111 derives therefrom a short-term component of airspeed. This signal is combined with the long-term airspeed signal at summing junction 112 providing an accurate velocity signal $V_C$.

The calculated flight path signal $\gamma_c$ from divider 98 is connected with the error compensation circuit 115 which, as discussed fully above, includes a differentiator network 116, a rate limiter 117 and an integrator 118. The resulting bias signal is connected with summing junction 119 for negative compensation of the flight path. The flight path signal $\gamma_c$ is connected with lag and lead networks 120 and 121, respectively, and the two modified signals are connected with summing junction 122, the output of which is a flight path signal having improved dynamic characteristics which is also connected as an input with summing junction 119. A pitch signal, $\gamma$, from vertical gyroscope 109, is summed with the flight path and bias signals at summing junction 119 to provide an output which represents angle of attack with the compensating bias signal.

The dynamic response of an aircraft to elevator control is such that angle of attack and pitch change rather rapidly and at about the same rate when the elevators are manipulated. However, the flight path angle has a tendency to lag behind the elevator control. The system of FIG. 10, utilizing basically a flight path angle signal, will have an undesirable lag in responding to pilot control. Several sources of lead information are available. These include the rate of change of angle of attack, $\dot{\alpha}$, and the rate of change of pitch angle, $\dot{\theta}$. However, both are rather noisy signals and $\dot{\theta}$ responds to turbulent conditions providing a short-term signal component which is undesirable. The system of FIG. 10 provides lead information based on pilot manipulation of the elevator. An elevator angle signal, $\delta_e$, from an elevator position transducer 124, is connected through an elevator filter 125 with summing junction 126, where it is combined with the $\alpha$ + bias signal from summing junction 119 to provide a signal which drives the indicator bar of the VLA display (not shown). The elevator filter has a lead characteristic with a time period based on the aircraft response to elevator control.

The pitch scale signal for the VLA display is obtained directly from vertical gyroscope 109.

Figure 11:
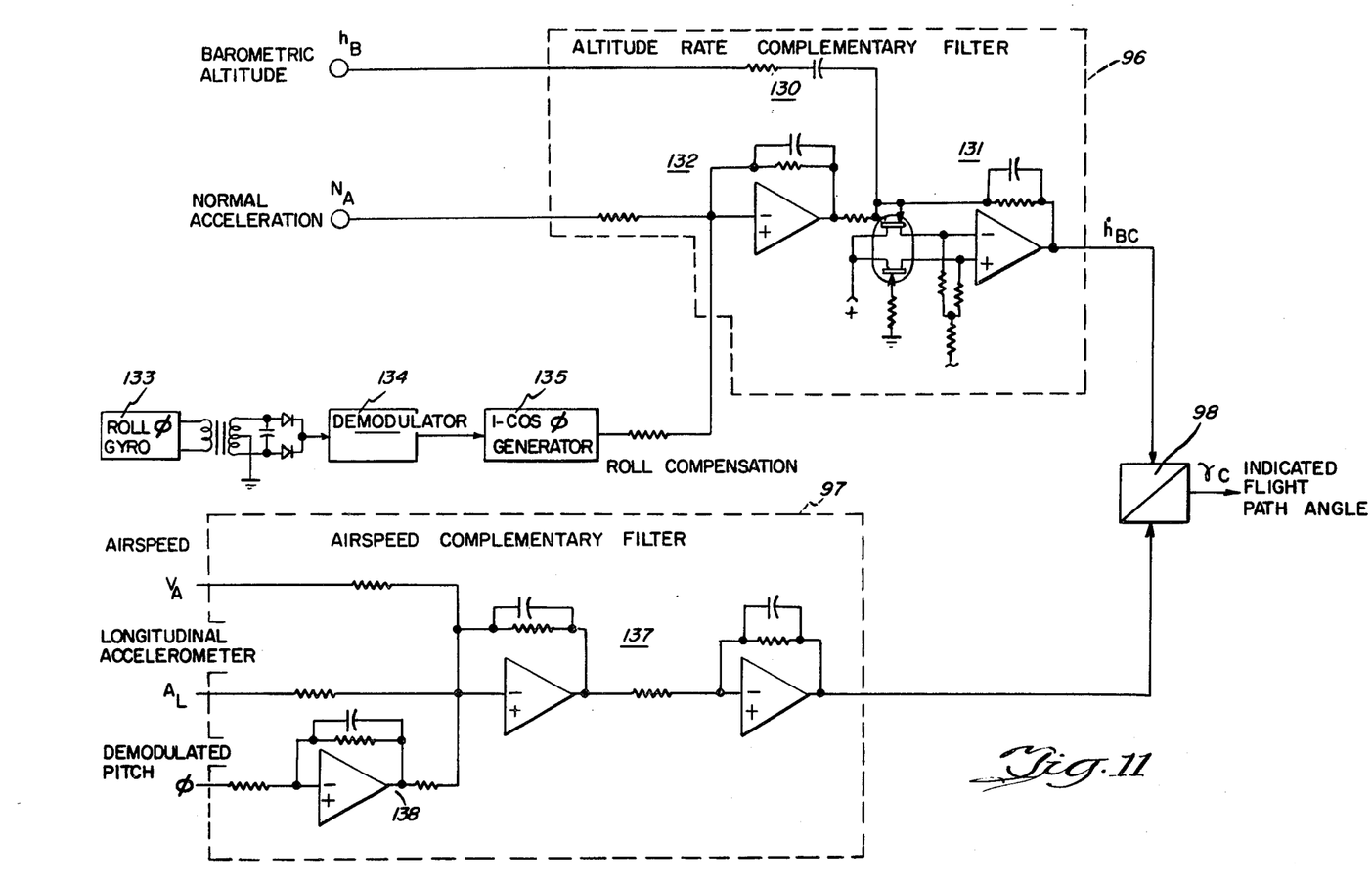
FIG. 11 is a circuit diagram, partially schematic and partially block in form, illustrating an implementation of a portion of the functional block diagram of FIG. 10.

A simplified schematic diagram of the flight path angle computer is shown in FIG. 11. This detailed disclosure is intended only to indicate one manner in which the circuit may be constructed. Many other circuits will be obvious. In general, only the principal signal handling circuits are shown. Power circuits for the amplifiers, for example, are omitted.

In the altitude rate complementary filter 96, the barometric altitude signal $H_B$ is connected through differentiator 130 with an input of summing amplifier 131. The normal acceleration signal $N_A$ is processed by an operational amplifier filter 132. The normal acceleration signal is roll compensated to eliminate the response of the normal accelerometer to the roll position of the aircraft. A roll signal $\alpha$ from roll gyroscope 133 is connected with a demodulator 134 and processed by a function generator 135, the output of which is equivalent to the term $1 - \cos \phi$, representing the effect of a roll on the normal acceleration signal. This compensating signal is summed with the normal acceleration signal in filter 132, the output of which is added to the barometric rate signal in summing amplifier 131.

The airspeed complementary filter 97 sums and filters the airspeed signal $V_A$, the longitudinal accelerometer signal $A_L$ and the pitch signal $\theta$, in a two-stage summing and filtering amplifier 137. Filter 138 lags the pitch signal slightly to reduce turbulence effects. The calculated altitude rate and forward velocity signals are connected with divider 98 to provide the calculated flight path angle signal $\gamma_c$.

Figure 12:
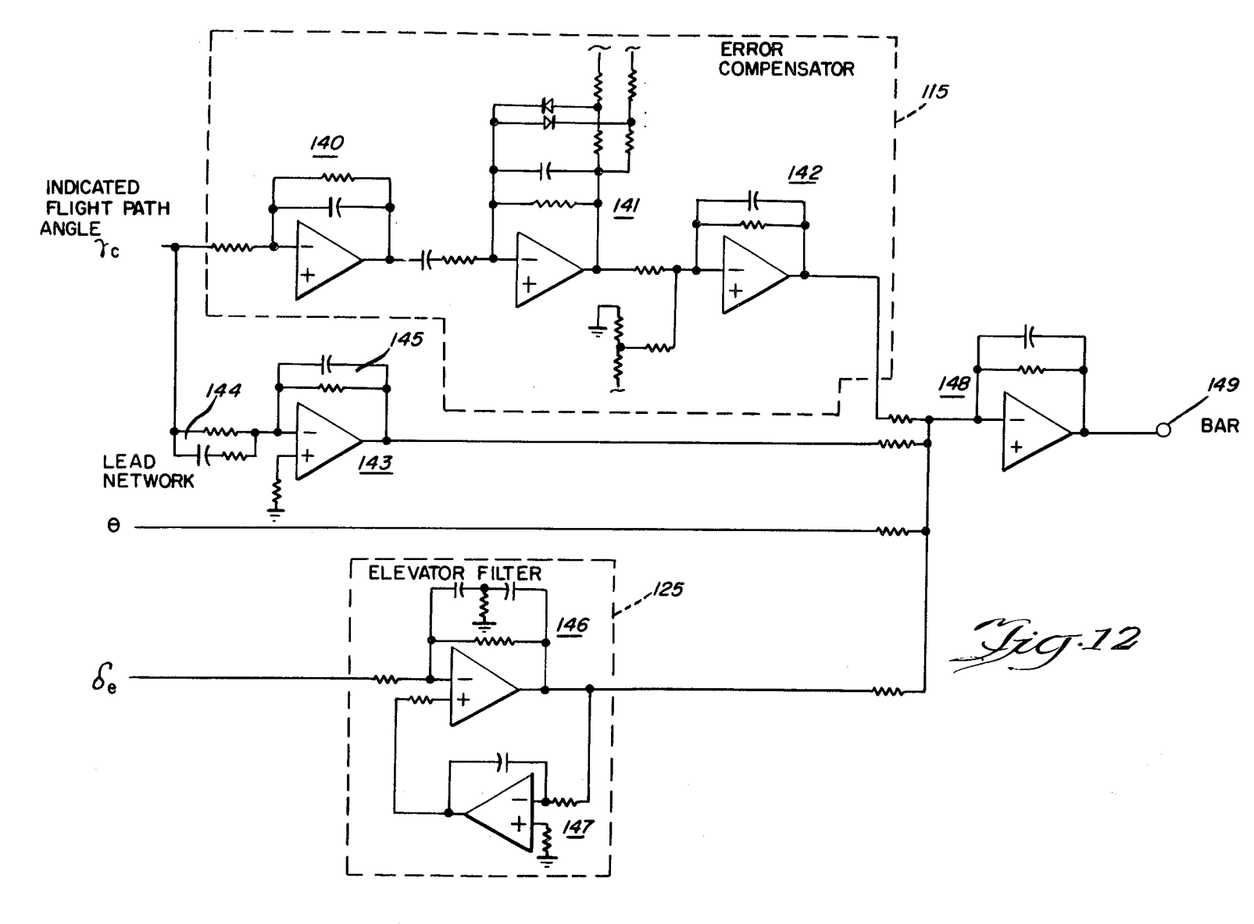
FIG. 12 is a circuit diagram, partially schematic and partially block in form, illustrating an implementation of another portion of the functional block diagram of FIG. 11.

FIG. 12 illustrates circuitry for the error compensator and elevator filter. Error compensator 114 includes an operational differentiator 140, the output of which is connected with limiter circuit 141. The bias signal is developed by integrator 142. Amplifier 143 serves the functions of both lag and lead networks 120, 121, having a lead filter 144 in the input and a lag filter 145 in the feedback network. A suitable elevator angle filter 125 uses a pair of operational filters 146, 147, with the feedback networks utilized dependent on the dynamic characteristics of the aircraft. The signals are combined in summing amplifier 148 which has a feedback network providing a lag characteristic for the biased angle of attack signal appearing at output 149, and displayed by the bar of the VLA instrument (not shown).

Figure 13:
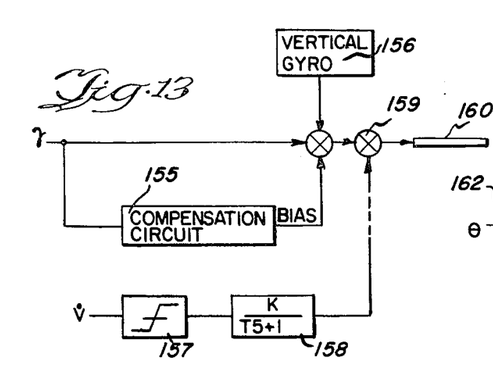
FIG. 13 is a partial block diagram illustrating an instrument with inertial acceleration compensation.

The instrument utilizing flight path angle, $\gamma$, as a basic input signal, which is summed with the output of a vertical gyroscope to provide the signal displayed by the indicator bar of the VLA has a signal component representing forward acceleration, because of an inherent erection error in the gyroscope, which enhances operation. This system is illustrated in FIG. 13 where the flight path angle $\gamma$ is combined with a bias signal from compensation circuit 155 and a signal from the vertical hydroscope 156. If the erection error of the gyroscope is insufficient to provide the desired correction, an additional signal may be added based on the rate of change of inertial velocity, $\dot{V}$ (which may be obtained by differentiating the signal from the airspeed complementary filter 97, FIG. 10). The $\dot{V}$ signal is connected through limiter 157 and a lag filter 158 to a summing junction 159 where it is combined with the $\alpha$ + bias signal for display on the VLA indicator bar 60.

Figure 14:
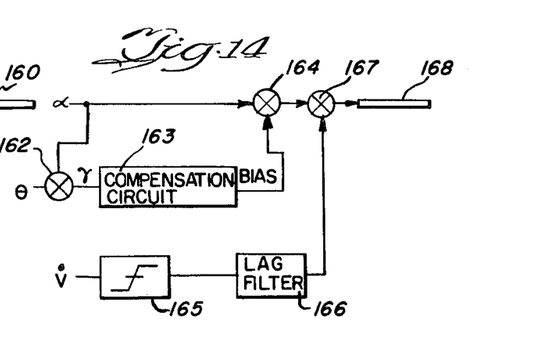
FIG. 14 is a partial block diagram illustrating another form of the instrument of FIG. 13.

A similar compensation can also be provided where the basic signal used is angle of attack. This is illustrated in FIG. 14. As in the system of FIG. 5, angle of attack $\theta$ is summed with pitch angle at summing junction 162 to provide flight path signal $\gamma$ to compensation circuit 163. The bias signal is combined with the angle of attack signal at summing junction 164. The inertial ground speed acceleration, $\dot{V}$, is connected through limiter 165 and filter 166 to summing junction 167 where it is combined with the $\alpha$+ bias signal for display on VLA bar 168.

The effect of the inertial ground acceleration, whether from an erection error of the vertical gyroscope or derived and added to the bar signal intentionally, will be illustrated by the following example. In a typical approach situation, the pilot utilizes a constant thrust setting. He controls the aircraft through elevators, to maintain the desired flight path angle and to keep the VLA bar superimposed on the desired touch-down point. If there is a head wind error, the indicator bar is above the aircraft velocity vector (see FIGS. 1 and 3). The pilot tends to compensate for this by pitching the aircraft over whereupon the flight path steepens and inertial speed increases. This increase in speed is added to the bar signal to bring the bar down further than is warranted by the change in flight path angle or angle of attack. Thus, the deviation from the desired flight path angle is minimized.

We claim:

1. An aircraft instrument, comprising:
    means establishing a signal representing an aircraft flight path condition;
    a head-up display means for said signal, indicating to the pilot the flight path of the aircraft with reference to the ground;
    means including a source of signal representing the rate of change of the aircraft flight path and a rate limiter connected thereto, establishing a bias signal as the pilot follows the display; and
    means for combining said flight path condition and bias signals in said display.

2. The instrument of claim 1 in which said bias signal means includes an integrator connected with the output of the rate limiter.

3. An aircraft instrument, comprising:
    means establishing a signal representing the aircraft angle of attack;
    a head-up display means for said signal indicating to the pilot the flight path of the aircraft with reference to the ground;
    a source of signal representing aircraft pitch;
    means for combining the pitch and angle of attack signals for establishing a flight path signal;
    means establishing a signal representing a steady state component of said flight path signal;
    means for subtracting the steady state component from the flight path signal and establishing a flight path change signal;
    means for integrating the flight path change signal to establish a bias signal; and
    means for combining the bias and aircraft angle of attack signals in said head-up display.

4. The instrument of claim 3 including means for limiting the flight path change signal.

5. An aircraft instrument, comprising:
    means establishing a signal representing an aircraft flight path condition;
    means displaying the signal for the pilot;
    means establishing a signal representing a desired flight path for the aircraft;
    means establishing a signal representing the actual flight path of the aircraft;
    means combining the desired and actual flight path signals and establishing a signal representing the flight path error;
    means establishing a signal representing the change in flight path as the pilot follows the display;
    means for combining the flight path angle change and error signals;
    means for integrating the combined flight path angle change and error signals, establishing a bias signal; and
    means combining said flight path condition and bias signals in said pilot display.

6. An aircraft instrument, comprising:
    means establishing a signal representing aircraft angle of attack;
    a head-up display means for said angle of attack signal, indicating to the pilot the flight path of the aircraft with reference to the ground;
    means establishing a signal representing aircraft pitch angle;
    means combining the pitch and display signals, establishing a flight path signal;
    means for determining a change of said flight path angle;
    means for integrating said change of flight path signal to establish a bias signal; and means for combining the bias signal with the angle of attack signal in said pilot display.

7. An aircraft instrument, comprising:
means establishing a signal representing the aircraft angle of attack;
a head-up display means for said angle of attack signal, indicating to the pilot the flight path of the aircraft with reference to the ground;
means establishing a bias signal representing the change in flight path of the aircraft as the pilot follows the displayed signal; and
means combining said bias signal with said angle of attack signal for display to the pilot for positive flight path compensation.

8. The instrument of claim 7 in which a positive flight path signal represents a climb and a negative flight path signal represents a descent, a positive bias signal represents a change in flight path reducing descent or increasing climb and the negative bias signal represents a change in flight path increasing descent or decreasing climb and said bias signal is subtracted from the angle of attack signal for positive flight path compensation.

9. An aircraft instrument, comprising:
means establishing a signal representing the aircraft angle of attack;
a head-up display means for said angle of attack signal, indicating to the pilot the flight path of the aircraft with reference to the ground;
means establishing a bias signal representing the change in flight path of the aircraft as the pilot follows the displayed signal; and
means combining said bias signal with said angle of attack for display to the pilot for negative flight path compensation.

10. The instrument of claim 9 in which a positive flight path signal represents a climb and a negative flight path signal represents a descent, a positive bias signal represents a change in flight path reducing descent or increasing climb and the negative bias signal represents a change in flight path increasing descent or decreasing climb and said bias signal is added to the angle of attack signal for negative flight path compensation.

11. An aircraft instrument, comprising:
a source of signal representing vertical velocity of the aircraft;
a source of signal representing forward velocity of the aircraft;
means for dividing the vertical velocity signal by the forward velocity signal to establish a signal representing the inertial flight path of the aircraft;
a source of signal representing the pitch of the aircraft;
means combining said inertial flight path and pitch signals to provide a flight path condition signal;
a head-up display means for said flight path condition signal indicating to the pilot the flight path of the aircraft with reference to the ground;
means establishing a bias signal representing the change in the flight path as the pilot follows the displayed signal; and
means for combining the flight path condition and bias signals in said display.

12. The instrument of claim 11 in which the source of signal representing vertical velocity includes a source of signal representing the rate of change of the barometric altitude of the aircraft, a source of signal representing the integral of the normal acceleration of the aircraft and means for combining the barometric rate and integrated normal acceleration signals to provide a composite vertical velocity signal.

13. The instrument of claim 12 wherein said combining means comprises a complementary filter combining the long term components of the barometric altitude rate signal and the short term components of the normal acceleration signal.

14. The instrument of claim 11 in which the source of signal representing forward velocity includes a source of signal representing air speed of the aircraft, a source of signal representing forward acceleration of the aircraft and means for combining the air speed and forward acceleration signals to provide a composite forward velocity signal.

15. The instrument of claim 14 wherein said combining means comprises a complementary filter combining the long term components of air speed and the short term components of the forward acceleration signal.

16. An aircraft instrument, comprising:
means establishing a signal representing an aircraft flight path condition;
means displaying said signal for the pilot;
means establishing a bias signal representing the change in flight path as the pilot follows said signal;
means establishing a signal which is a function of forward acceleration of the aircraft; and
means for combining the flight path condition, bias and forward acceleration signals in said pilot display.

17. The instrument of claim 16 including a source of signal representing the inertial flight path of the aircraft, a gyroscope providing a source of signal representing the pitch of the aircraft and means combining said inertial flight path and pitch signals to provide said flight path condition signal, said gyroscope having an erection error due to acceleration, a component of the signal from the gyroscope representing forward acceleration of the aircraft.

18. The instrument of claim 16 including means for measuring the relative wind past the aircraft body to provide said flight path condition signal and in which said forward acceleration signal is referenced to the ground.

19. The instrument of claim 16 in which said source of forward acceleration includes a source of signal representing the rate of change of velocity with reference to the ground, a limiter and an integrator for said limited velocity rate signal.

20. An aircraft instrument, comprising:
means establishing a signal representing an aircraft flight path condition;
means displaying said signal for the pilot;
means establishing a bias signal representing the change in flight path as the pilot follows said signal;
means for deriving a signal representing the displacement of an aircraft control to modify the aircraft flight path condition;
means for deriving from said displacement signal a rate signal, said rate signal deriving means having a time period comparable with the time for response of the aircraft to operation of said control; and means for combining said bias and rate signals with the flight path condition signal in said pilot display.

21. An instrument for synthesizing a signal representing forward velocity of an aircraft, including:
 a source of signal representing air speed of the aircraft;
 a source of signal representing forward acceleration of the aircraft; and
 a complementary filter means connected with said signal sources for combining the long term components of the air speed signal with a short term forward velocity signal derived from said forward acceleration signal to provide a composite forward velocity signal.

* * * * *

UNITED STATES PATENT OFFICE
CERTIFICATE OF CORRECTION

PATENT NO. : 3,686,626
DATED : August 22, 1972
INVENTOR(S) : Charles Donald Bateman, Lyle J. Noland It is certified that error appears in the above-identified patent and that said Letters Patent are hereby corrected as shown below:

Column 3, line 54, change "air craft" to -- aircraft --.

Column 7, line 45, change "pivot" to -- pitot --.

Column 8, line 5, change "$\gamma$" to -- $\theta$ --;
line 51, change "$\alpha$" to -- $\phi$ --.

Column 9, line 2, change "114" to -- 115 --;
line 26, change "hydroscope" to -- gyroscope --;
line 39, change "$\theta$" to -- $\alpha$ --;
after "pitch angle" insert -- $\theta$ --;
line 52, after "through" insert -- the --.

Column 11, line 34, after "attack" insert -- signal --.

Signed and Sealed this eleventh Day of May 1976

[SEAL]

Attest:

RUTH C. MASON
Attesting Officer

C. MARSHALL DANN
Commissioner of Patents and Trademarks